US006281986B1

(12) United States Patent
Form (10) Patent No.: US 6,281,986 B1
(45) Date of Patent: *Aug. 28, 2001

(54) METHOD FOR BROWSING ELECTRONICALLY STORED INFORMATION

(75) Inventor: Simon Form, Bristol (GB)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/700,174

(22) Filed: Aug. 20, 1996

(30) Foreign Application Priority Data

Sep. 29, 1995 (EP) .................................................. 95306950

(51) Int. Cl.⁷ .............................. H04N 1/00; G06F 13/00; G09G 5/00
(52) U.S. Cl. ........................... 358/403; 358/444; 345/203; 345/522
(58) Field of Search ..................................... 395/173, 960, 395/788; 345/122, 123, 121, 124, 125; 386/67, 68, 6, 7, 111; 358/404, 444, 403

(56) References Cited

U.S. PATENT DOCUMENTS

| 3,723,644 | * | 3/1973 | Haskell | 178/6.6 P |
| 5,124,691 | * | 6/1992 | Sakamoto | 340/721 |
| 5,434,591 | * | 7/1995 | Goto | 345/123 |
| 5,530,455 | * | 6/1996 | Gillick | 345/163 |

FOREIGN PATENT DOCUMENTS

| 0327931A2 | 1/1989 | (EP) | H04N/1/41 |
| 0327931A3 | 1/1989 | (EP) | H04N/1/41 |
| 0573922A2 | 6/1993 | (EP) | G06F/15/401 |
| 0573922A3 | 6/1993 | (EP) | G06F/15/401 |

OTHER PUBLICATIONS

High–Speed Networking and Multimedia Computing, vol. 2188, pp. 287–289, C. Parris et al., "Network Support for Lossless Digital Image Browsing".

Digest Of Papers, Eighth IEEE Symposium on Mass Storage Systems Emerging Solutions for Data–Intensive Applications, May 11–14, 1987, pp. 21–26, R. Yule, "A Mass Storage System for Realtime Image Data Caching".

* cited by examiner

Primary Examiner—Jerome Grant, II (57) ABSTRACT

A method for accessing and using stored electronic documents. The stored documents are presented to the user in a manner which visually simulates document types that most users are familiar with, such as books. Each page of the document is divided into frames. Both the individual pages and the frames comprising them are ranked based on locational, representational and logical attributes. These rankings are called herein semantic hints. The user determines the review speed of the document, and that review speed in turn determines which frames and pages will be moved from memory into cache at any particular time, as well as determining which of the pages and frames will be either fully or partially rendered on the display.

14 Claims, 9 Drawing Sheets

SELECTED

CLOSED

OPENED

PRIMED-LOCKED OR SECURED

DISCARDED

FIG. 11a  NEWSPAPER

FIG. 11b  REFERENCE BOOK

FIG. 11c  DICTIONARY

FIG. 11d  JOURNAL

METHOD FOR BROWSING ELECTRONICALLY STORED INFORMATION

TECHNICAL FIELD

The present invention relates to the display of documents stored in electronic form. More specifically, it relates to methods for enhancing the browsing of such documents.

BACKGROUND ART

Paper, for reasons of long familiarity and universal dissemination, is the information storage and transfer medium people are most comfortable and adept with. The most commonly used paper information storage form remains the book and similar objects, and advantages can be obtained by creating the illusion of such objects for those using a computer. In this model, computer objects present their information content as a sequence of regular pages, each potentially displaying a variety of media types.

Browsing information in an electronic medium consists of the repetitive selection and display of portions of that information. These portions of the information are referenced herein as "pages" and the information itself is referenced to as the "document". The "document type" defines how the document is displayed; e.g. an electronic book would have its pages displayed from left to right and a rollerdex from bottom to top.

Reading a document at low speed is easily supported by most hardware architectures. Pages stored in a slow mass storage off-line memory are prefetched into a fast access cache memory before being loaded into the display memory. Prefetching into a cache overcomes delays caused by the slow access time of the off-line mass storage device. As the browsing rate increases, however, the bandwidth of the data paths between the off-line memory, cache and display memories and the memory access times become limiting factors in how quickly new pages of the document can be displayed. Data rates high enough to fulfil the requirement that the user remain unaware of the computer interface can often not be achieved. This leads to uneven and often long delays between the selection of desired material and its display, the delay depending on the page's content. Even when there is a high bandwidth available, complex page structures in the data to be displayed can cause problems for efficient browsing and navigation.

A paper, "An Electronic Book: APTBook", Human-Computer Interaction Conference INTERAC '90, pages 513–519 by Miyazawa et al describes one possible solution to this problem. A technique called "hierarchic compression" is employed for fast browsing. A compressed version of the page content is displayed, showing little detail. As the browsing speed decreases, progressively more details of the page are shown. This method is implemented by storing the book's contents in a fixed hierarchical tree structure. The data is accessed horizontally across the tree, the browsing speed defining the level at which data is accessed. Because the importance of a particular feature of a document is defined by its position in the tree structure, this solution is inflexible and can not easily be adapted to other electronic document structures. This solution also makes assumptions about the logical organization of the electronic document. In some applications the displayed compressed data makes no useful contribution to the display as it is unreadable. In such cases it would be preferable if the compressed data was not displayed at all as it serves only to "clutter" the display. The ability to limit the information displayed is not discussed in the APTBook paper and no mention of how the data structure is related to the memory hierarchy of the browsing system is made.

Other relevant articles include, "Software For Reading Text On Screen", D. J. Pullinger, Human-Computer Interaction, IFIP, 1987 and "Formative Design-Evaluation of SuperBook", D. E. Egan, et al., Bellcore, ACM Transactions on Information Systems, Vol. 7, No. 1. Both articles state the problem well but provide no satisfactory solution to presenting electronically stored data in a book form, which can be as easily and rapidly manipulated by the user as a book.

SUMMARY OF THE INVENTION

According to the present invention we provide a method for viewing electronically stored documents at different speeds, the speed being adjustable by the user, the method comprising the steps of:

storing the electronic documents in long term memory as a plurality of pages, a page being further stored as a plurality of frames, each frame comprising a data type;

characterised by rating the stored frames, the rating depending on at least the frame's data type and/or location; and moving frames from the long term memory into a cache memory depending upon the user selected viewing speed and the rating of the frame.

In this way, frames are rated to determine whether they are stored in the cache memory or the long term memory for a given viewing speed so that the frames which it is more important to display at high viewing speeds get allocated storage space in the cache memory.

In the embodiment to be described, at a first user selected viewing speed, all of the stored frames are moved into the cache memory regardless of their rating. This means that the viewing speed is slow enough for the content of all of the frames to be fully displayed. At a second user selected viewing speed, only frames having a rating above a first predetermined rating are moved into the cache memory. Other frames have their content represented in the cache memory in less detail eg as a fallback rendition and such frames are not fully displayed during viewing. At a third user selected viewing speed, only frames having a rating above a second predetermined rating greater than the first predetermined rating are moved into the cache memory.

Preferably, three attributes are recorded for a frame and influence its rating, one attribute indicating the appearance of the frame, one attribute indicating the logical function of the frame in the page and the other attribute indicating the position of the frame on the page.

Preferably, one or more of the stored pages are also rated. The use of page ratings in addition to frame ratings provides greater flexibility in the system and can facilitate the initialising of a system for document viewing. More weight may be given to page ratings than frame ratings in determining which frames are moved into the cache memory. The page rating may determine whether a page is pre-loaded into the cache memory prior to document viewing by a user.

In the embodiment to be described, the electronically stored document is made visually to resemble a book on a display screen, and selecting the first, second and third viewing speeds incrementally increases the speed at which pages of the book appear. In this embodiment, fewer frames of each successive page are moved from the long term memory to the cache memory as the user selects increasingly higher viewing speeds, with at least one frame from each successive page which indicates the position of the frame within the book being moved from the long term memory to the cache memory.

According to another aspect of the present invention we provide a system for permitting a user to view electronically stored documents at different speeds, the system comprising:

- a long term memory for storing the documents as a series of pages, each page in turn being formed from a plurality of frames,
- a cache memory for temporarily storing frames recalled from the long term memory;
- a processor coupled to the cache memory and the long term memory so that, on the processor receiving from a user both a request for a stored document and a requested viewing speed, the processor recalls selected frames from the long term memory into the cache memory;
- a display coupled to the processor for displaying pages and frames;
- characterised in that each frame is rated relative to its viewing priority and in that the rating of a frame and the requested viewing speed determine whether the processor recalls the frame to the cache memory.

Preferably, the processor recalls increasingly fewer frames from the long term memory to the cache memory as the requested viewing speed increases.

The embodiment of the present invention to be described comprises a method for representing an electronic document in the form of a book that can be displayed and manipulated by a user. The book comprises a sequence of regular pages. The layout of each page is composed of adjoining or overlapping regular frames laid out across the surface of each page of the book. Frames contain the actual content of the electronic document. The content of each frame is restricted to a single media type and the media types include text, graphics, and other types of information.

Books are only one type of electronic document that might be used with the present invention. For example, the electronic document might comprise a rollerdex, or similar file. Additionally, there are many different types of books which might be represented, including almanacs and dictionaries whose content is accessed by means of distinct and characteristic manipulations.

The page and frames are units of selection for discrete parts of the document. Each page as a whole and each frame separately has one or more attributes. For a frame, the combination of that frame's attributes and the attributes of the page of which if forms a part yields a measure of that frame's relative importance.

This system of weights is called herein 'semantic hinting'. The actual weights applied are called semantic hints. Semantic hints may be applied relative to whole pages (page semantic hints) or relative to individual frames (frame semantic hints). A particular page or frame need not have an associated semantic hint. The semantic hint itself may not possess values for all of the key attributes.

For each type of electronic document, the page and frame semantic hints control which parts of that document are moved from long term memory into the cache as the user reviews the document. Moreover, as the user indicates that he or she wishes to review the document at different rates of speed, the same semantic hints are used to determine which parts of the document need to be fully displayed for the user and which parts can be either shown as a fallback rendition or omitted altogether.

For example, if the electronic document is a book and the user is moving through it very slowly, all frames for each successive page are moved from memory to cache and then displayed. If the user wishes to move through the book faster, only specific frames are moved fully into the cache, perhaps only those frames representing chapter headings and page numbers. The other information on each page, such as text, might simply be represented by a fallback rendition showing straight continuous lines where the text would be. As the speed of review changes, the present invention uses the semantic hints of the pages and frames to move less or more detail of each individual frame or page into the cache. As the speed of review increase, the present invention also looks further into the memory and moves some amount of information from relatively distant pages.

The present invention will now be described in detail, by way of example, with reference to the figures listed and described below.

BRIEF DESCRIPTION OF DRAWINGS

FIGS. 8a, 8b, 8c, and 8d show how the cache update process operates;

DETAILED DESCRIPTION OF THE INVENTION

Figure 1:
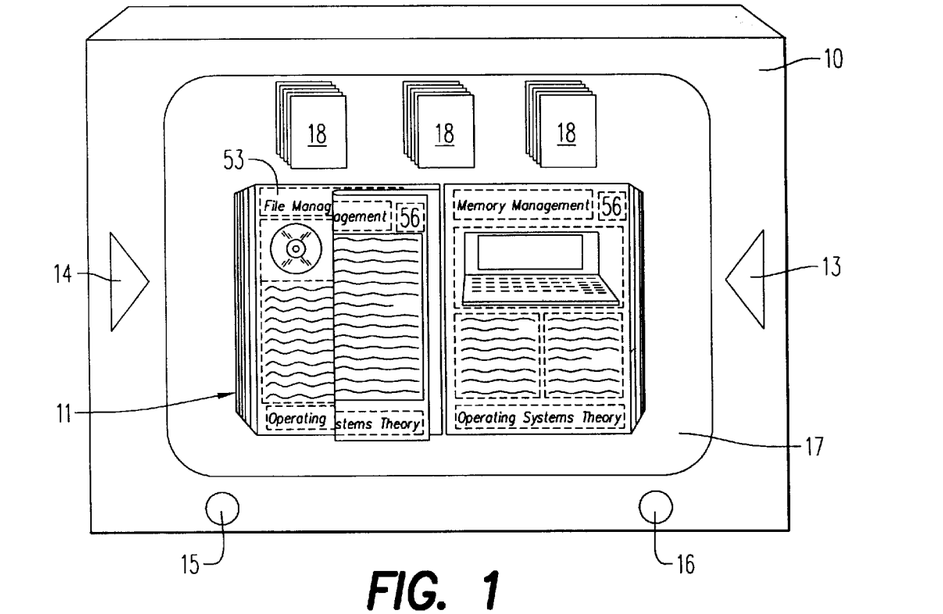
FIG. 1 shows an electronic document browsing device in which the present invention is used to display an electronic document.

FIG. 1 shows a known electronic document browsing device 10. Browsing control device 10 comprises a display 17 which is used for inspecting electronic documents and control buttons 13 and 14 which are used to move to the next or previous pages of the document, respectively. Buttons 15 and 16 implement control functions such as "power on" and "reset". Documents are stored in an off-line storage device and pages of the documents are loaded into browsing device 10 for display under control of buttons 13 and 14. Device 10 also contains a display controller and a display memory to support the display of loaded pages.

Display 17 shows documents 11 and 18. Documents 18 are stored in an off-line store and are still closed. Document 11 has been opened and is currently displaying pages 53 and 54. Page 54 is in the process of turning to reveal the next two pages, 55 and 56.

Electronic documents are displayed in such a way that they resemble, as much as possible, paper documents. Such features as the left and right thickness of the displayed pages indicate overall size of the document and the current position of the display within the document.

A central binding axis indicates that the data model is designed to provide the user with the same experience they would have using a book. The double-faced page display models the view a user would have of a real book. Animation is used to gradually reveal the contents of the next or preceding pages, giving the appearance and effect of turning a real page within a real book.

In browsing device 10, the user has access to three browsing speeds: "peruse", "flip" and "riffle". Peruse is the slowest browsing speed and is used when the user wants to read a section of the current page. Flipping is a higher browsing speed, used when the user does not want to read the full contents of a page but is rather searching for a page having a particular feature. The user would flip through the document according to section headings, figures, etc. Riffling is the fastest browsing speed and is used when the user is searching for a particular page using still more general features of the document, including relative position within the document, page numbers, and page headings. The object of both flipping and riffling is to search for a particular page. Riffling is used when very few of the features on the page are required to identify the page. Flipping is used when more of the features of a page are needed.

Browsing speed is determined by detecting the elapsed time between successive depressions of the browsing buttons 13 and 14. For example, after a page has been completely displayed as a result of depressing button 13, button 13 is depressed again. The system interprets this as a request for peruse browsing speed. If button 13 is depressed when more than half but not all of the current page is displayed, the system interprets this as a flip browsing speed request. Depressing button 13 again before some predetermined threshold point, e.g. before half of the current page is displayed, is interpreted as a request for riffle speed.

A further access method called "jump" is available which permits the user to make random or arbitrary page selections.

Figure 2:
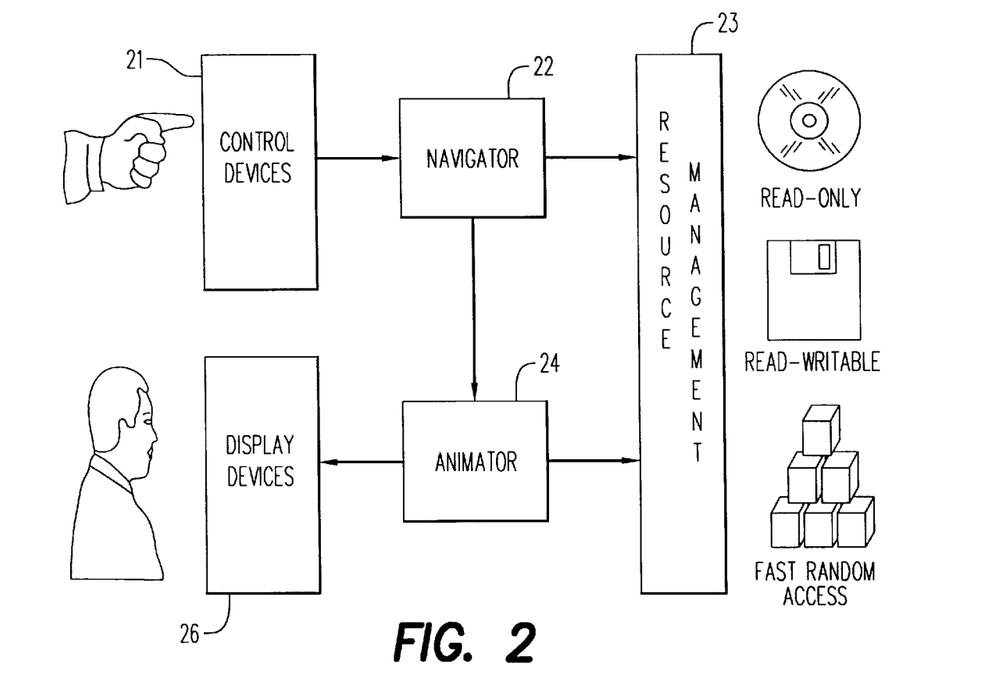
FIG. 2 is a block diagram of an electronic document browsing system.

FIG. 2 is a block diagram of the internal architecture of document browsing device 10 shown in FIG. 1. Control devices 21 convert physical user actions (pressing a button, flicking a switch etc.) into page oriented gestures (incrementally turning a page forward by 1, jumping to page 20, etc.) Control devices 21 generate "gesture protocols".

Navigator 22 organizes the selection and loading of specific documents and co-ordinates the realization of the page gestures provided by control devices 21. Navigator 22 uses data acquisition protocols to load a document and "animation protocols" to co-ordinate the revelation of a particular page or set of pages.

Resource management unit 23 is responsible for mapping the document, incremental page loading and unloading between cache and off-line memory, and performs any necessary data transformations. The resource management unit communicates with memory and other device sub-systems through appropriate device driver interfaces.

Animator 24 co-ordinates the selective display of portions of the document's data content in line with predefined animation schemes for the particular type of document being displayed (folding, pulling or sliding page, either rotated around points or against vertical or horizontal axes etc.). This component uses data acquisition protocols to secure and transform(render) the data content of the document, and a display protocol to map rendered data to a display device.

Display devices 26 map rendered images to a particular display device. This component communicates with the display sub-systems through appropriate display driver interfaces.

Figure 3:
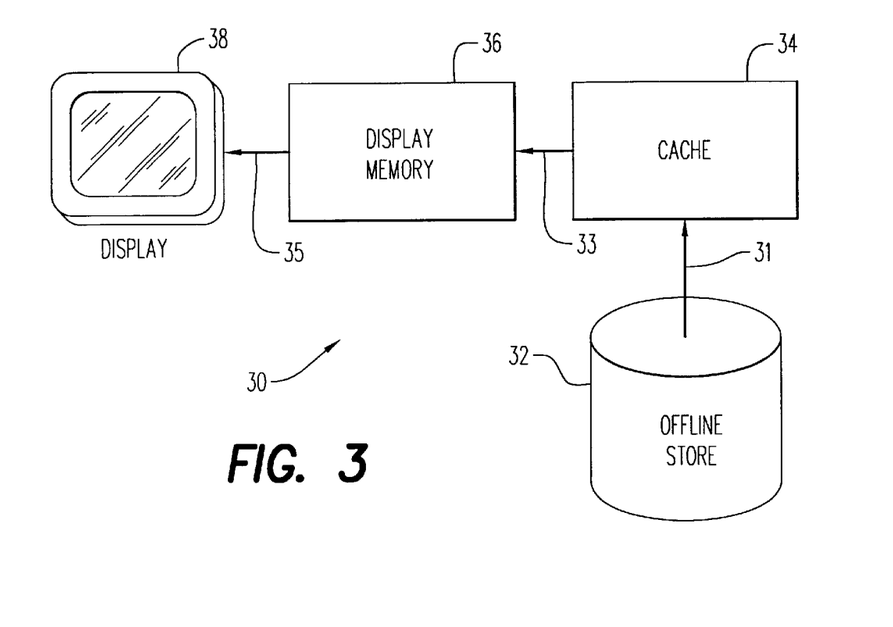
FIG. 3 is a block diagram of the memory organization of the present invention.

The storage hierarchy 30 of device 10 (FIG. 1) is shown in FIG. 3. Off-line storage device 32 stores documents. Off-line storage device 32 is usually a hard-disk drive or a CD-ROM drive, both of which have large storage capacities. When displaying a document, the information representing the document is loaded from off-line storage device 32 into display memory 36. Display memory 36 is usually video RAM (VRAM) mounted on a display controller board.

Due to the long data access times of off-line store 32, especially when compared to the data access times of display memory 36, a caching memory 34 is needed to buffer data from off-line store 32 to display memory 36. Document data is pre-fetched from off-line store 32 into cache 34 before being written to display memory 36. Some data from previous pages remains in cache 34 so that it can be accessed again quickly if needed. The use of a cache to buffer data from an off-line storage device and page replacement algorithms used with a cache are known.

The display of a document can be related to storage system 30 using the concept of "display contexts". The part of the document currently being viewed is the "active context". This corresponds to the page currently in display memory 36. The "dormant context" is the part of the document not currently being viewed and corresponds to pages stored only in off-line store 32. A third, intermediate state is "candidate context", which is the part of the dormant context available to be displayed next. In terms of storage hierarchy 30, the candidate context is stored in cache memory 34. The definition of candidate context allows for storing pages both preceding and following the active context in cache memory 34, allowing bidirectional browsing.

In most applications, pages will contain large blocks of text and figures. A page, therefore, often represents a large amount of data. "Perusing" the pages of an electronic document does not present a problem for most hardware implementations of system 10. However, "flipping" and especially "riffling" the pages require data to be transported from off-line store 32 to display memory 36 at very high speeds. Conventional off-line storage devices are not capable of the required data transfer speeds needed to support the flipping and riffling modes. Data paths 33 and 35 are also too small and would become "bottlenecks". Increasing the capacity of cache 34 would improve the off-line storage access times at great expense, as a large cache is required.

In flipping and riffling browsing modes, the user does not use the full contents of the page to make a decision as to its relevance. The user decides unilaterally on a number of features which he or she will look at on each page and makes the decision as to the relevance of the page based on this group of features. The features a user might choose depend on the type of document.

The present invention applies this reasoning to optimise the use of the memory system shown in FIG. 3. For riffling and flipping, it is only necessary to prefetch the visually important features of the following pages into cache 34 from off-line store 32 and to retain only the visually important features of the previous pages stored in the cache. This allows a reasonably sized cache memory to effectively buffer a great many more pages than is known in the art. The data path bottlenecks are also removed, because less data from each page is transferred through the storage system 30 at any one time.

Some indication of the presence of other less visually important information on the page may be given in order to maintain same semblance of the page to the original paper. Such information is represented by "fallback renditions", i.e. representations requiring very little data bandwidth to load. A line of typed text could be represented as a straight line and a page of text as multiple horizontal straight lines. This failback rendition is similar to what a user sees when riffling through a real book. Generally, fallback renditions are used when elements of the document can not be moved to the active or candidate contexts in the time available or the elements themselves are not deemed sufficiently relevant to the browsing process.

The present invention segments the page according to features which can be used in any application to facilitate higher browsing speeds. The segments are represented by data structures which are assigned "attributes". The attributes define the relative visual importance of the segment for that application.

Figure 4:
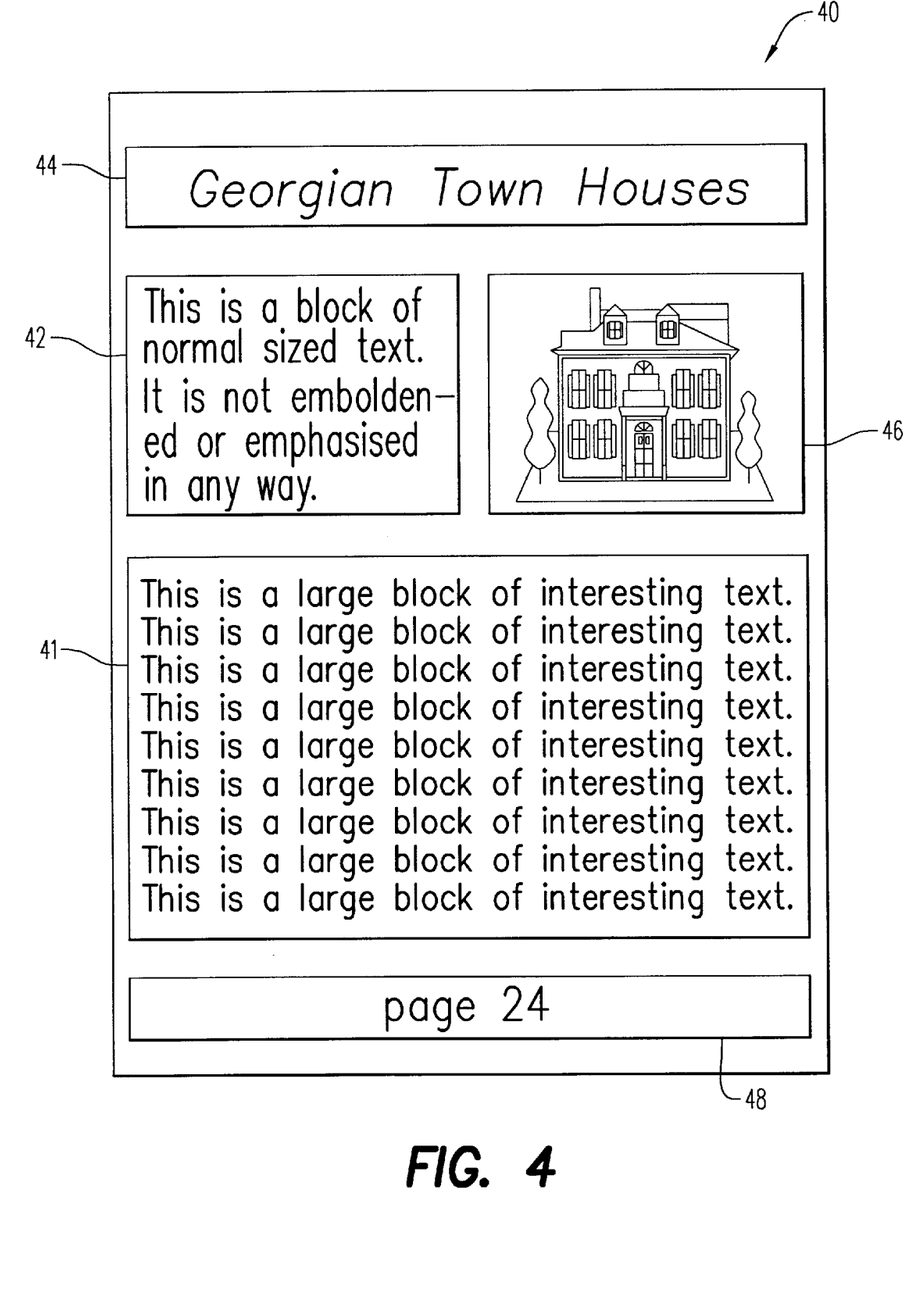
FIG. 4 shows how a typical printed page is broken into frames.

FIG. 4 shows how a sample page is split up into frames according to the present invention. Frame 41 comprises the main body of the text, frame 42 is a separate body of text, frame 44 is the title, frame 46 is a picture, and frame 48 is the page number. These frames are stored as separately accessible entities so that they can be loaded independently of each other.

In order to decide which frames need to be displayed for a particular browsing rate, each frame is rated according to its relative visual importance within the page. In the first preferred embodiment of the present invention, three attributes are used to define the visual importance of a frame.

A representational attribute defines how the frame represents its data: text, picture, etc. If the frame is text, the type of font used is defined, because visual importance is dependent on the size and style of a particular font. Other possible representational attributes are graph, table, schematic and colored.

A logical attribute defines the function of a frame within the page: header, footer, body of text data, etc. Similarly, the function of the page within the document can be defined: chapter, appendix, index, pages, first page, last page, etc. This attribute also gives an indication of the variance of a frame's content, thus allowing invariant frames (such as a footer saying 'CONFIDENTIAL') to be cached once and then used repeatedly.

A positional attribute defines where the frame appears on the page. This may determine the frame's visual importance but primarily determines the order of display of the frames on a given page. This attribute may depend on the type of document. In a book, the effect of turning a page is created by displaying the frames progressively from right to left. In a rollerdex, frames are displayed progressively from the bottom to the top of the page. The page is divided up into a set of possible locations, each of which is assigned a value, which is in turn assigned to the positional attribute of the frame occupying that location. At present there are four possible page locations: bottom left, bottom right, top left and top right. These attributes are assigned by the system.

A group of attributes associated with a particular frame is known as a "frame semantic hint". Semantic hints may also be applied to whole pages—"page semantic hints". A particular page or frame need not have an associated semantic hint. The semantic hint itself need not possess values for all of the attributes. An electronic document may contain both forms of semantic hints.

Page semantic hints are used to describe the type of page. It is interpreted together with the browsing speed to determine which page should be pre-fetched next. The importance of a page depends on the type of document. Page semantic hints are used to define to what extent complete pages are important within the document. A page semantic hint may comprise only a single attribute For the page shown in FIG. 4, the page semantic hint might be PSH_REGULAR_PAGE (an ordinary page with no special advantages) and the frame semantic hints would be

| | |
|---|---|
| Frame 41 | Representational Attribute (TEXT & SMALL_FONT) |
| | Logical Attribute (BODY) |
| | Positional Attribute (LOWER_LEFT & LOWER_RIGHT) |
| Frame 42 | Representational Attribute (TEXT & SMALL_FONT) |
| | Logical Attribute (BODY) |
| | Positional Attribute (UPPER_LEFT) |
| Frame 44 | Representational Attribute (TEXT & MEDIUM_FONT) |
| | Logical Attribute (HEADER) |
| | Positional Attribute (UPPER_LEFT & UPPER_RIGHT) |
| Frame 46 | Representational Attribute (PICTURE) |
| | Logical Attribute (BODY) |
| | Positional Attribute (UPPER_RIGHT) |
| Frame 48 | Representational Attribute (TEXT & MEDIUM_FONT) |
| | Logical Attribute (FOOTER & PAGE_NUMBER) |
| | Positional Attribute (LOWER_LEFT & LOWER_RIGHT) |

If the preceding page was perused, the system assumes that the page shown in FIG. 4 will be perused, and it will be displayed gradually from right to left (as if the user were reading a book), and the order and content of the prefetch and subsequent display would be frames 48, 46, 44, 42 and 41 with each frame's content fully displayed and no fallback displays.

If the preceding page was flipped, the page shown in FIG. 4 is assumed to be flipped, and only frames 44 and 48 displayed, with frames 42 and 46 available as fallback renditions. The page number is visually important in the sense that it allows the book to be browsed according to page number.

If the preceding page was riffled, then the page shown in FIG. 4 is assumed to be riffled and only frame 48 is displayed, with frames 44 and possibly frame 46 available as failback renditions.

Since semantic hints describe the relative visual importance of a particular frame they can be used to determine which frames should be prefetched into cache for a particular browsing speed. They also determine which frames already in the cache can be replaced, because, as sequential progress is made through the document, frames from earlier pages must be transmitted back to off-line storage. The decision as to which frames are replaced is made using a combination of known cache replacement algorithms and the present invention's page or frame semantic hints.

It is the developer of a system for browsing electronically stored documents who decides on the relative significance of the various attributes which are included in the frame semantic hints. The model devised will depend on the nature of the artifact eg. a newspaper will be treated differently from a dictionary, as will be explained in more detail later. An algorithm for resolving the priority of the frames to be displayed delivers numerical priority values for each of the relevant frames. Page semantic hints are processed in a similar way and will normally take precedence over frame semantic hints.

Semantic hinting is applicable to any type of electronic document and improves the meaningful browsing speed whatever the data-path limitations and off-line storage access times of the particular hardware implementation.

A system using the present invention's method of semantic hinting will now be described. A document is stored as an inner document model. This is a description of the layout structure of the document with additional information appended to provide sufficient knowledge of the intended logical structure to benefit the required style of use. Examples of such information are page and frame semantic hints. This description aims to be independent of any specific document encoding methodology but is sufficiently detailed to capture any reasonable page layout.

The inner document model is optimized to support visualization of all or part of the content of a multi-page document. To ensure simplicity, the model can be read only so as not to permit editing.

Figure 5:
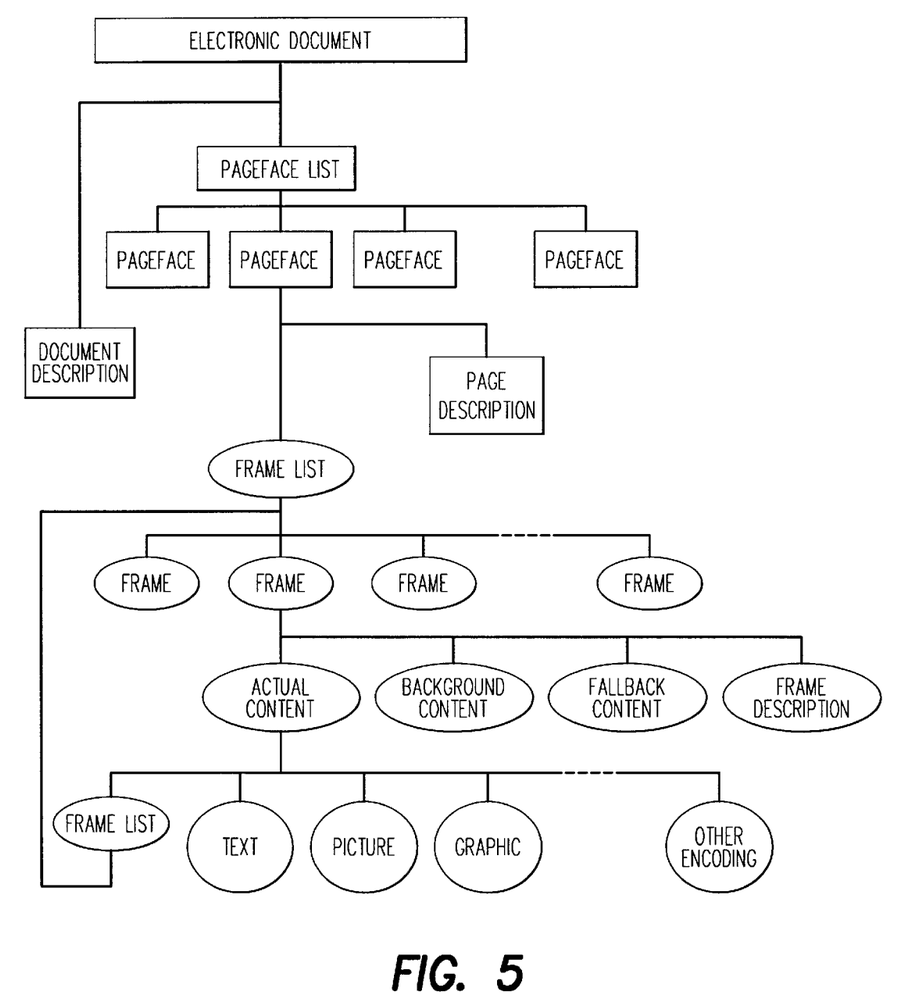
FIG. 5 illustrates the storage hierarchy of an electronic document.

FIG. 5 illustrates the storage hierarchy of an inner document model. Each document is broken down into a fixed sequence of pages, each page being composed of potentially overlapping frames, each of which contains either another set of frames or contents. Each content is comprised of one and only one fill type. Content fill types are generalized and include only text, picture and graphics.

Each frame references three contents: actual, background and failback. This permits at least some type of representational display, even if there is not enough time to display the actual contents.

In addition to these objects, each major element (document, page, frame) has a description object associated with it. This description object comprises primarily layout information: offset from origin, width and height, z-plane priority, etc., as well as semantic hints. The document description provides information on the overall object, its class, name, number of pages, etc.

The inner document model provides an abstract definition of the document in terms of its size, class, number of pages and how those pages are composed, in a manner independent of the document's expression in terms of system resources. 'Resource tagging' is the technique used to map elements of a document to particular resources within the system. Certain elements and objects are retained in the cache memory at all times and some are able to migrate between the cache and the off-line store.

Objects that are permanently resident in the cache include all objects that describe the structure of the document. This includes all elements other than actual content, background content, text, picture and graphic content fill objects. Any part of the document description may be accessed through fast memory without reference to the off-line store and immediate decisions taken as to whether or not it is necessary or desirable for resources to be assigned to any content fill the document may possess.

Each migratable object is assigned a tag to indicate the amount of resources invested in it. These tags include:

| | |
|---|---|
| DISCARDED | No resources are associated with the object. It will be located in the off-line store in its original encoding. |
| SELECTED | An initial investment of cache memory has been assigned and the object marked for reading (its disk file is opened). However, at this stage the object remains in the off-line store in its original encoding. |
| OPENED | The object has been read into cache memory but still retains its original encoding, which may or may not be displayable. Further cache memory will be assigned to this object should it require processing (rendering, decompression, etc.) to transform it into its required final form. |
| PRIMED | The object has been processed into its final form and is ready for display. In resource terms, the object is now fully invested. An object may undergo more than one data transformation process to reach its PRIMED state. |
| LOCKED | An object may be made resistant to the automatic cache refresh process. This is used for objects that must remain resident even when they are not part of or within the "range of probability" of the current working set. The investment of system resources remains the same as for the state they were in previously, either OPENED or PRIMED. |
| SECURED | This tag only applies to read/write implementations and is assigned to guarantee a PRIMED or LOCKED object which contains some user inputs and which is to be saved in secondary memory. Investment of system resources remains the same as for the state they were transformed from, either OPENED or PRIMED. Where write-through to secondary memory is not required or supported, this tag will not apply. |
| CLOSED | When a PRIMED or SECURED object is no longer deemed to warrant full resource investment, the resources associated with its final form (decompressed and rendered) are reallocated. However, the cache memory associated with the objects SELECTED state may be temporarily maintained, permitting the object to be re-OPENED without reference to the off-line store. Otherwise, the resources are fully reallocated and the object reverts to a DISCARDED state. |

This relatively complex model allows the cache to be managed in an anticipatory manner. For example, by distinguishing between OPENED and PRIMED states, objects can be held in skeletal form in anticipation of being required. However, they still occupy the minimum amount of cache memory, in case they are actually not needed. Should the object be needed for display, the process to convert it to its display form can be done without interrupting a user action. Similarly, maintaining a resource investment using CLOSED objects permits sudden changes in the direction the user is reading or browsing the document without requiring potentially disruptive disk accesses.

A migratable object occupies one and only one of these tagged states at any one time. The tag of a content fill object is held as an attribute of its parent frame object.

Figure 6:
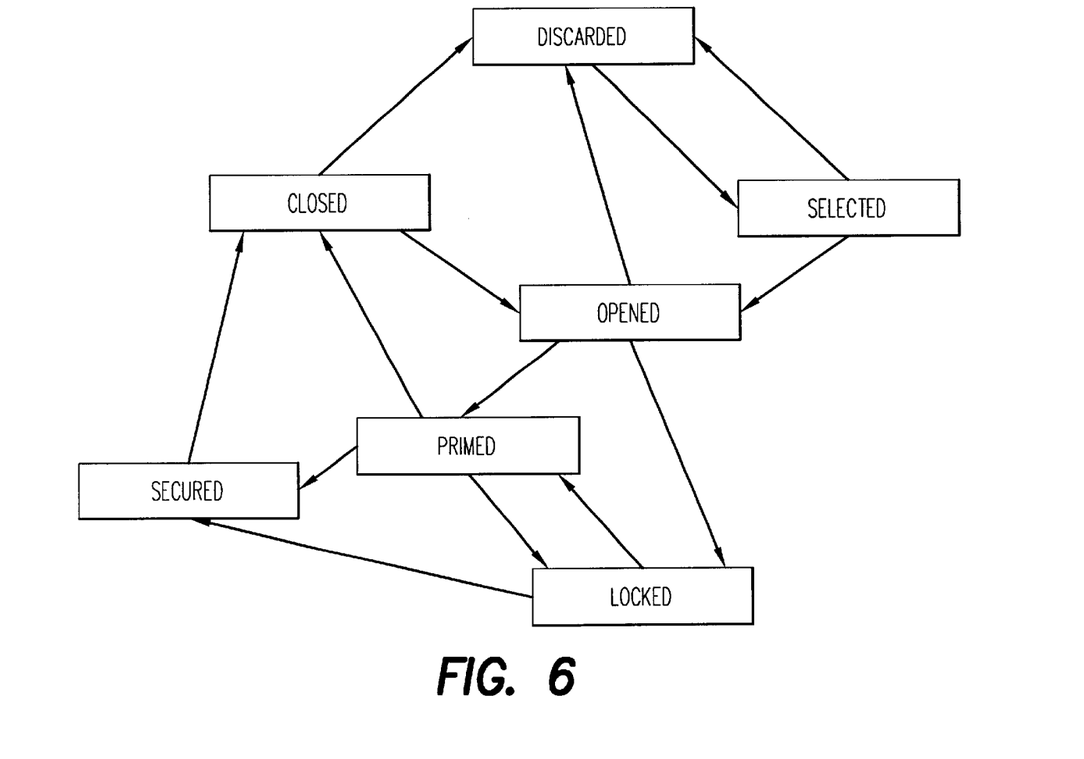
FIG. 6 is a state transition diagram, showing permissible state changes of objects using the present invention.

To maintain the integrity of user data and ensure an orderly and efficient use of system resources, there are rules governing the state transitions that can be performed on a particular object. Permissible state transitions of objects are shown in FIG. 6. From the DISCARDED state, an object may move only to the SELECTED state. From the SELECTED state, an object may return to the DISCARDED state or move to the OPENED state. From the OPENED state, permissible transitions are to the DISCARDED, PRIMED, or LOCKED states. If the object is in the LOCKED state, it can move to the PRIMED or SECURED states. From the PRIMED state, an object may move to the LOCKED, SECURED, or CLOSED state. From the SECURED state, the only permissible transition is to the CLOSED state. From the CLOSED state, an object can only transition to either the DISCARDED or OPENED states. Only a single transition is permitted at any one time. As mentioned previously, the SECURED state is only applicable to read/write implementations.

Tagged state transitions provide the relationships and rules which are manipulated by the cache management software. The software must detect when to change the state of a particular object and to what state it should be changed.

The resource tag allocated to a frame will depend on the numerical priority value (or "object rating") given to that frame according to the model used for interpreting the frame semantic hints.

The object rating is an indication of the relative importance of one object over another and is a measure of the probability that the user will select that object to be a member of the working set (i.e. the part of the page or pages currently in view). The higher the object rating, the higher the perceived probability of the user wishing to view the object. This higher probability justifies a greater investment of resources in developing the content of the object for display.

There is an important link between object rating and resource tagging. If the rating of an object is increased, this may change its tagged state to a higher order, from SELECTED to OPENED perhaps. Similarly, if an object rating is downgraded, the resource tag for that object may revert from say, PRIMED to CLOSED, reflecting its reduced probability of being viewed by the user.

A downward or upward re-rating of an object does not automatically trigger a change in its tagged state. The determination of critical point is a flexible function of available memory and interpretation of the navigation mode value. This feature allows the system to maintain a range of object ratings within a single resource tag.

The order of precedence, however, is fixed and reuns as follows

```
LOCKED>>
    <<PRIMED>>
        <<SECURED>>
            <<OPENED>>
                <<CLOSED>>
                    <<SELECTED>>
                        <<DISCARDED>>
``` where "<<" indicates increasing an object's rating and ">>" indicates decreasing an object's rating.

The steps from one state to another need not be fixed. As shown in FIG. 6, it is possible to "jump" states. For example, an object in the OPENED state may have its state changed to DISCARDED without first having it changed to SELECTED. In general, it is anticipated that object states will migrate to their immediate successor or predecessor.

The use of these features to achieve the desired behaviors in the system depends upon what values are assigned during object rating and how they are manipulated. This is described below.

The preceding static model provides a framework that defines an abstract electronic document language suitable for constructing the appearance of a document. The framework is independent of the document's provenance, the inner document model and the scheme for mapping elements of this model to real system resources. Now, a dynamic model is illustrated that uses this framework to achieve the performance goals required for those particular behaviors needed to maintain the illusion of using a paper document.

This will involve a description of how the cache refresh or update technique is used, either transparently by the system or under the influence of the driving application, to manage whatever resources are available.

Figure 7:
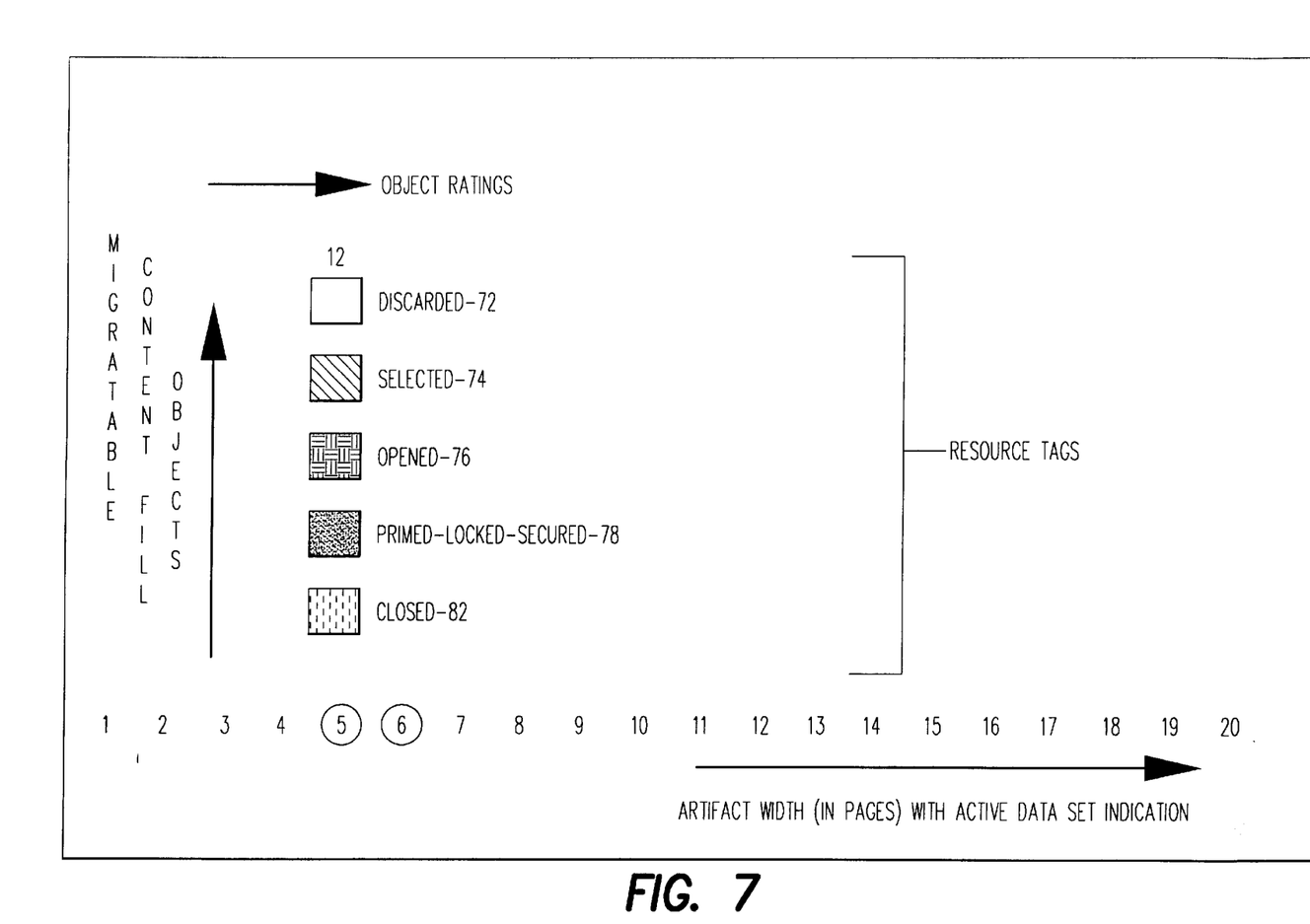
FIG. 7 illustrates how resource tags are classified and how they are rated.

FIG. 7 illustrates those symbols used in the succeeding figures to represent objects in the cache and their status. The width of the artifact is set out along the X-axis as a series of page numbers, the page number within a circle indicating the currently active data set. Boxes 72, 74, 76, 78 and 82 represent the resource tags that an object may have and the hatching/shading used for these in the succeeding figures. These tags are: DISCARDED (72), SELECTED (74), OPENED (76), PRIMED/LOCKED/SECURED (78) and CLOSED (82). All further discussions of resource tags in this description will use these labels and the same visual representation. The rating each page has is given as a number along the top of the succeeding figures. In the succeeding figures, the individual frames within a page are represented as a set of boxes in a column for each page.

Figure 8A:
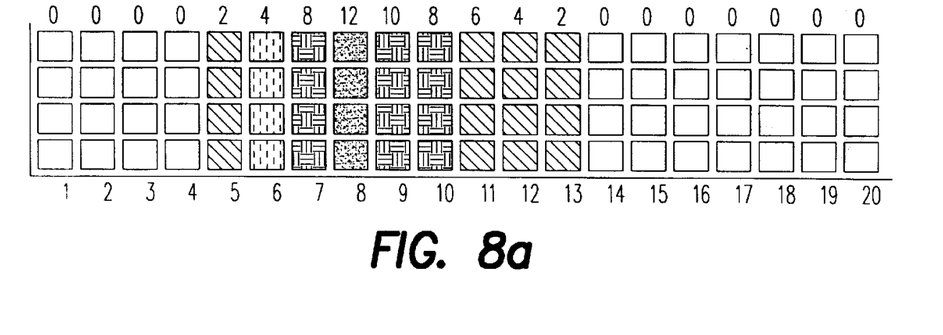
Figure 8B:
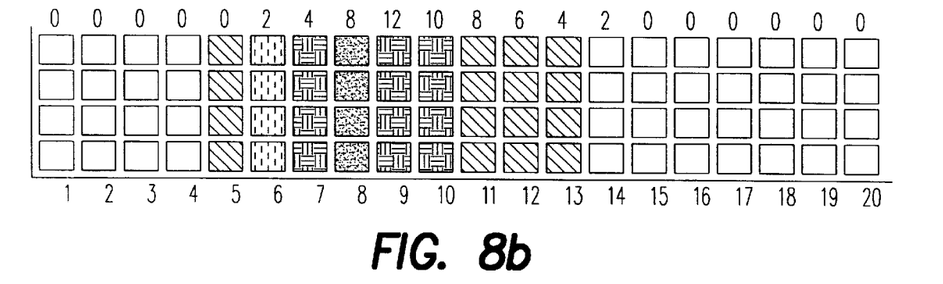
Figure 8C:
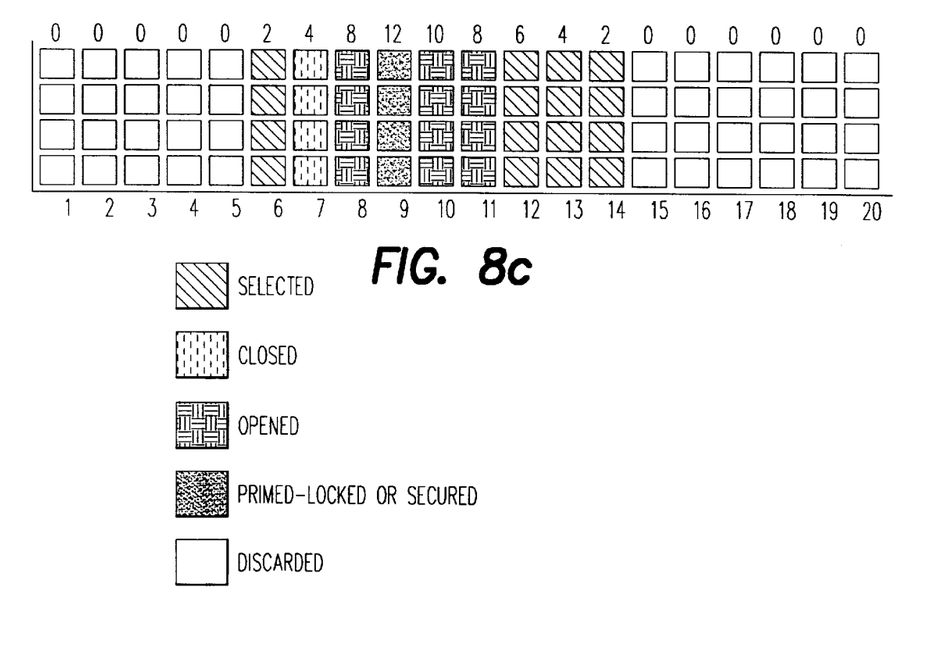

The cache refresh is a two phase process. FIGS. 8a, 8b, and 8c illustrate important stages of this process and the roles played by the concepts of resource tagging and object rating. The process is initiated when a new page selection is communicated to the system as a request to turn to the next forward page. In the figures, this is a turn from page 8 to page 9. Note in FIG. 8a the object ratings (shown along the top) associated with the current working set and its successors and predecessors. Page 8 has the highest rating (12). Pages increasingly remote from this page show a corresponding diminishment in their ratings and, as their ratings diminish, so do the resources dedicated to them as reflected in the resource tags. There is also an asymmetric slewing of general resource tagging in favor of the current direction of navigation (forward).

The first phase of the process of moving from one page to the next adjusts the object ratings to reflect new priorities and is shown in FIG. 8b. The current working set (page 8) has its rating downgraded from 12 to 8, as have the pages preceding the selected working set. Page 9 is upgraded, as are some of those pages in advance of the new selection.

At the end of the phase shown in FIG. 8b, the cache itself has not been realigned. It is the second phase of the refresh process, shown in FIG. 8c, that addresses the physical cache update. This process cycles through each page and frame of the electronic document, from start to finish, comparing each object's resource tag against its object rating. If a mismatch is detected, then the refresh algorithm may elect to upgrade or downgrade the object's tag state accordingly.

So for each page that was or now falls within the "range of probability" (pages 5 to 14):

Page 5 is now outside of the "range of probability" and is downgraded to zero. Its tag state reverts from SELECTED to DISCARDED.

Page 6 has been downgraded but is still within the "range of probability". It is given a SELECTED tag status.

Page 7 has been downgraded to such an extent that it cannot maintain it OPENED status and is downgraded to CLOSED.

Page 8 no longer has a high enough rating to justify its PRIMED resource tag, so it is downgraded to an OPENED tag state.

Page 9, the new working set, is upgraded to the maximum rating and has its resource investment correspondingly enhanced by increasing its tag status to PRIMED.

Page 10 has been upgraded from a rating of 8 to 10 but this is not deemed sufficient to alter its tag status, which remains OPENED.

Page 11 has been sufficiently upgraded to advance its tag status from SELECTED to OPENED.

Page 12 and Page 13 have not been sufficiently upgraded to alter their tag state, which remains SELECTED.

Page 14, which previously had fallen outside of the "range of probability" is now minimally upgraded and is assigned sufficient resources to improve its tag status from DISCARDED to SELECTED.

The criteria against which tag state and object ratings are compared is important in determining what action, if any, should be taken. The elements of these decision criteria are collected together as the cache profile descriptor. The cache profile descriptor is defined by the designer of the application software and it is passed by the driving application to the system, which utilises it to manage its resources.

In FIGS. 8a, 8b, and 8c, the cache profile descriptor is relatively simple. Its members include (the actual values used in the above example in parenthesis):

the directional alignment of the cache (FORWARD)

the maximum number of objects to retain a LOCKED tag state (ZERO)

the maximum number of objects to retain a PRIMED tag state (ONE)

the number of leading pages (FIVE)

the number of trailing pages (THREE)

frame sort parameter (NONE)

navigation mode (PERUSING)

companion autoload flag (OFF)

"Companion autoload" refers to the automatic loading of the companion page to a requested page when a book representation is being used. The meaning and significance of "frame sort parameter" will be discussed later.

There may be insufficient resources to fully satisfy the requirements of an application's cache profile descriptor. In such a case, the system undertakes to match the requirements as closely as possible. For example, in the example of FIGS. 8a, 8b, and 8c, there may not have been sufficient resources to transform the resource tag state of page 14 from DISCARDED to SELECTED. Had that occurred, then the cache refresh system would have started to discard the lowest rated objects amongst the trailing pages, because cache alignment is FORWARD. In this example, pages 6 and 7 would be discarded to make room for page 14.

By setting the cache descriptor in different ways, different cache profiles are created as will be seen in FIG. 10 to be described later.

The design of specific cache refresh methods is determined by how the page frame contents are to be presented to the user i.e. the user model. The important features of the user model are as follows: the electronic document class and sub-class (a reference book and a novel are sub-classes of the electronic document class BOOK), the browsing mode (peruse, flip, riffle or jump), and sometimes the relative importance of the frames/pages within the electronic documents logical organization (their semantic significance).

Figure 9:
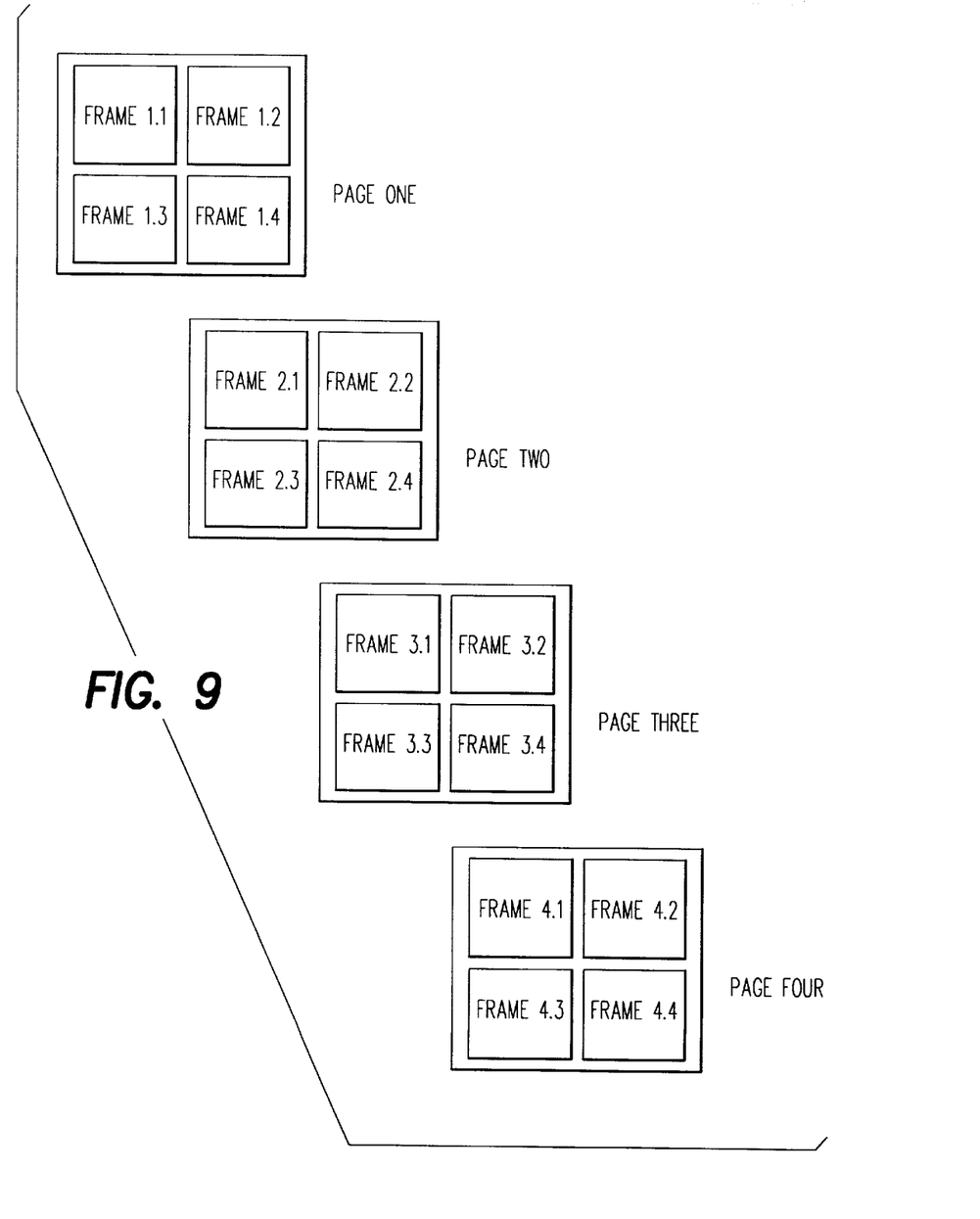
FIG. 9 illustrates a document with a plurality of pages and frames.

FIG. 9 shows a sequence of pages and their composite frames. The order in which the content fills for these frames is accessed from the off-line store will differ for different electronic documents.

For example, if the electronic document were of class "Rollerdex" i.e. bound along the top edge, so that the page is revealed from bottom to top, one sheet at a time, then the order of frame content revelation would run as follows:

| Page | Frame | Content Type |
| --- | --- | --- |
| ONE | 1.4 | Actual |
| ONE | 1.3 | Actual |
| ONE | 1.2 | Actual |
| ONE | 1.1 | Actual |
| TWO | 2.4 | Actual |
| TWO | 2.3 | Actual |

-continued

| Page | Frame | Content Type |
| --- | --- | --- |
| TWO | 2.2 | Actual |
| TWO | 2.1 | Actual |
| THREE | 3.4 | Actual |
| THREE | 3.3 | Actual |
| THREE | 3.2 | Actual |
| THREE | 3.1 | Actual |
| FOUR | 4.4 | Actual |
| FOUR | 4.3 | Actual |
| FOUR | 4.2 | Actual |
| FOUR | 4.1 | Actual |

This assumes the use of the peruse browsing mode. If the browsing mode were accelerated to "browse", then only initial frames would be fully realized, other frames only being displayed as fallback renditions:

| Page | Frame | Content Type |
| --- | --- | --- |
| ONE | 1.4 | Actual |
| ONE | 1.3 | Actual |
| ONE | 1.2 | Fallback |
| ONE | 1.1 | Fallback |
| TWO | 2.4 | Actual |
| TWO | 2.3 | Actual |
| TWO | 2.2 | Fallback |
| TWO | 2.1 | Fallback |
| THREE | 3.4 | Actual |
| THREE | 3.3 | Actual |
| THREE | 3.2 | Fallback |
| THREE | 3.1 | Fallback |
| FOUR | 4.4 | Actual |
| FOUR | 4.3 | Actual |
| FOUR | 4.2 | Fallback |
| FOUR | 4.1 | Fallback |

A similar pattern emerges, however, if the fastest "riffle" mode is used. The topmost frame's content would not even be rendered in fallback but would be excluded altogether, and the bottom-most frame's content would appear in failback only, thus, the pattern would be reduced to:

| Page | Frame | Content Type |
| --- | --- | --- |
| ONE | 1.4 | Fallback |
| ONE | 1.3 | Fallback |
| TWO | 2.4 | Fallback |
| TWO | 2.3 | Fallback |
| THREE | 3.4 | Fallback |
| THREE | 3.3 | Fallback |
| FOUR | 4.4 | Fallback |
| FOUR | 4.3 | Fallback |

This, in itself, would only be of marginal benefit, as the user would not be able to use clues from the actual content of particular frames to mediate his or her browsing. A slightly slower version, using some semantic weighting between the frames that are displayed could provide this extra clue. For example, the bottom-right most frame containing a page number has greater semantic significance than the bottom-left-most frame which remains in fallback only. Thus we would now have:

| Page | Frame | Content Type |
|---|---|---|
| ONE | 1.4 | Actual |
| ONE | 1.3 | Fallback |
| TWO | 2.4 | Actual |
| TWO | 2.3 | Fallback |
| THREE | 3.4 | Actual |
| THREE | 3.3 | Fallback |
| FOUR | 4.4 | Actual |
| FOUR | 4.3 | Fallback |

Now a fast "riffle" with highly selective actual data is presented to the user.

The example above is a simple electronic document. An example implementation of an electronic "book" will now be presented. A book has a two page working set, bound along either left- or right-hand side of each page, with pages mapped onto either side of each "leaf". Since it involves two pages being displayed together, frames from two different pages will need to be accessed. Referring again to FIG. 9, if, therefore, pages ONE and TWO were the current working set and page FOUR were selected then the resolved order of access would be:

| Page | Frame | Content Type |
|---|---|---|
| FOUR | 4.2 | Actual |
| FOUR | 4.4 | Actual |
| THREE | 3.1 | Actual |
| THREE | 3.3 | Actual |
| FOUR | 4.1 | Actual |
| FOUR | 4.3 | Actual |
| THREE | 3.2 | Actual |
| THREE | 3.4 | Actual |

The designer of a software application implementing the present invention will define the frame sort criteria to be used in the algorithm for resolving the priority of frames referred to earlier. The frame sort criteria form part of the cache profile descriptor and are the generic ordering criteria to distinguish the semantic significance of frames within a page. For example, for a particular artifact, the frame sort criteria could define the following order of priority (most important first) for the attributes making up a frame semantic hint:
Representational Attribute—GRAPHIC, PICTURE, TEXT
Logical Attribute—HEADER, FOOTER, BODY
Positional Attribute—BOTTOM, MIDDLE, TOP In the absence of semantic hinting, the system will respond to other frame sort criteria, which may pertain to layout or content fill type. For example, the driving application (via the cache profile descriptor) may request frames to be ordered in a top to bottom layout order. To distinguish between frames occurring at the same vertical offset, the criteria might be refined to include left to right order. Similarly, the application may request that frame contents containing black and white pictures may be accessed ahead of frames with color pictures or text, independently of their layout priority. In the absence of any guidance criteria, the system supplies frame contents in their default layout order.

It is clear that by varying the parameters of the electronic document class, browsing mode and semantic significance, correspondingly wide variations in the operational requirements of the system are necessary.

The examples above capture the requirements for the specific cache update algorithm but do not illustrate how these relate to the object rating and resource tagging schemes used to implement this algorithm in terms of real system resources. FIGS. 10a, 10b, 10c and 10d show how the cache profile of an electronic "book" is refreshed in each of its four browsing modes. Please note that the same visual coding scheme for resource tags used in FIGS. 7 and 8 is used in FIG. 10. The semantic significance of the frames on a page increases towards the bottom of the diagrams.

Page numbers are shown along the bottom of FIGS. 10a–10d and semantic significance is also shown—the lower blocks in each column are more significant than the upper blocks. Each column of frames has already been sorted using the frame sort criteria in conjunction with the semantic hints.

Figure 10A:
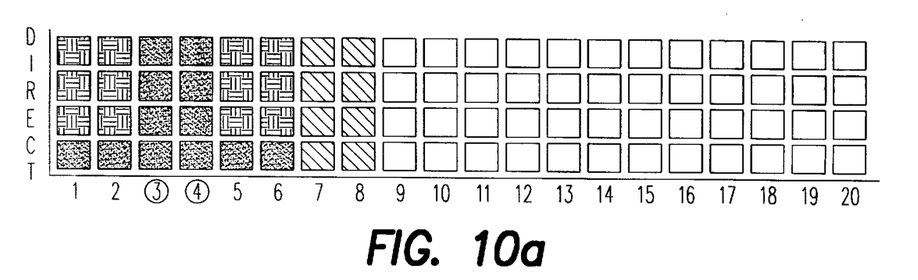
FIGS. 10a, 10b, 10c, and 10d show how the cache update process of the present invention operates at different reading speeds.

In the first profile, "jump" mode is used to "open" the book to reveal pages 3 and 4. The system accesses the actual content of each of the four frames of each of these pages. At this stage the system cannot determine the direction of browsing, so it attempts prefetch related processing equally on either side of the working set. This means all of the frames of the pages of the working set (pages 1, 2, 5 and 6) are OPENED and those deemed to be of greatest semantic significance are PRIMED. The immediate successors of the forward pages (pages 7 and 8) are SELECTED, as would be the immediate predecessors of the prefetched trailing pages if they existed. So in whichever direction the user chooses to commence browsing, the system will be able to respond immediately.

Figure 10B:
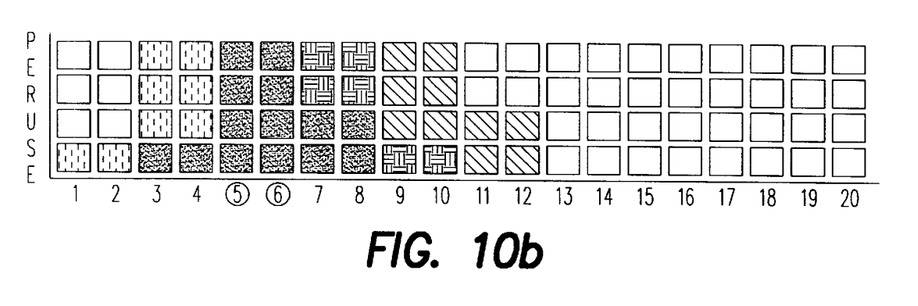

The user moves off in a forward direction at a 'PERUSE' speed. As shown in FIG. 10b, this means selecting pages 5 and 6 as the new working set. Resource priorities are now assigned to pages in the forward direction. This is shown by the resources invested in the immediate successors of the selected set (pages 7 and 8 are OPENED and the most semantically significant frames are PRIMED), in comparison with their immediate predecessors (pages 3 and 4, which were fully PRIMED but have now been mainly CLOSED). This reflects the cache update program's greater weighing of the probability that the user will next select pages 7 and 8 rather than revert to pages 3 and 4. Observation suggests that a not negligible probability of such a reversal does exist, and sufficient investment is maintained to ensure that an immediate response can still be made if necessary. In this particular mode, the emphasis is still on fully resolving the working set as it is assumed the viewer is closely studying the actual content. It is not necessary to advance the present pre-fetch much beyond the immediate successor set, as reasonable time intervals will occur before more data needs to be fetched.

An increase in navigational speed changes the navigation mode to 'FLIP'. In this mode, shown in FIG. 10c, the investment in the selected working set (pages 7 and 8) has been reduced to allow a more advanced pre-fetch. This can be seen in the fact that the least semantically significant frames of the working set have been OPENED but not PRIMED, and that the most semantically significant frames of not only the immediate successors of the working set but also their successors have been PRIMED. This reflects the anticipation that only a reduced interval will exist between each new working set selection, but the user still expects to have a substantial amount of the page's actual data presented rather than the reserved fallback images.

Figure 10C:
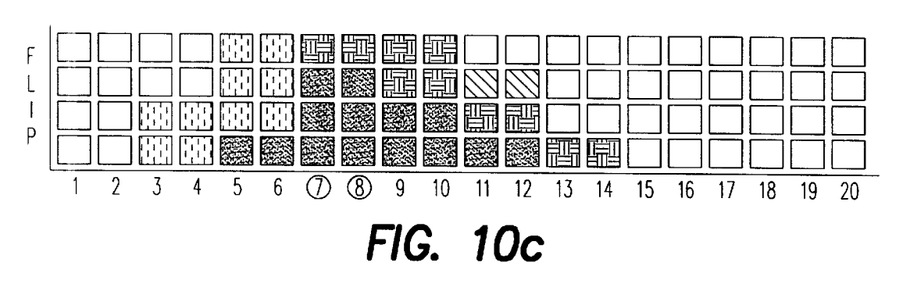
Figure 10D:
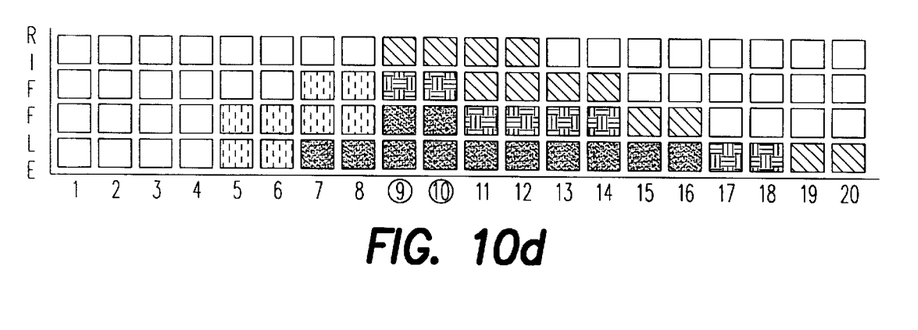

The 'RIFFLE' navigation mode, shown in FIG. 10d, is effectively an extreme version of the 'FLIP' mode of FIG. 10c. The user is moving so fast through the page sets that he may well simply be navigating to a 'known location' in the artifact, in which case the frame contents are largely irrelevant, or, as in the example here, the user is relying upon only the most semantically significant frame of each page. However, at any point the user may change modes and expect the actual content of all the frames presented to be available. To satisfy the conflicting demands of this mode, the system compromises by implementing a long, shallow advance pre-fetch, minimizes investment in trailing pages as the probability of a sudden change in direction is deemed extremely low in this mode, and the investment in PRIMED frames is distributed over as many forward pages as practical. Beyond the range of PRIMED pages, reduced investments such as OPENED and SELECTED are made in greatly advanced pages.

FIG. 10 shows how the balance between dormant, candidate and active contexts shift as the rate of browsing increases from the starting condition shown in FIG. 10a through slow page turning in FIG. 10b, faster page turning in FIG. 10c, and, finally, riffling in FIG. 10d. These profiles show how an application uses semantic hinting to make decisions as to which frames are prefetched in anticipation of display.

An additional refinement available through knowledge of the relative semantic significance between frames and pages ('semantic hinting') is the ability to optimize the performance of particular instances of artifacts by pre-loading selected parts of their content. The principle of this technique is that the most semantically significant parts should be those which will be most immediately available. Semantic hints, in this context, may derive from the page description (table of content pages, index pages, chapter title pages, bibliography pages, help pages) or the frame description (headers, footers, page numbers, headlines).

FIGS. 11a, 11b, 11c, and 11d demonstrate how semantic hinting can be applied to prefetching different page frames in four different types of electronic documents when each is browsed quickly. The page numbers of the documents are presented on the X-axis and the frames along the Y-axis. The columns in the figures represent the set of frames that make up a given page. Each column of frames has already been sorted using the semantic hinting criteria. Note that the number of frames on a page has been artificially limited to four in order to simplify the figures. In the figures, the black blocks represent the frames of each page which would be prefetched into the cache when riffling the document. The prefetching profiles vary according to the type of document.

Figure 11A:
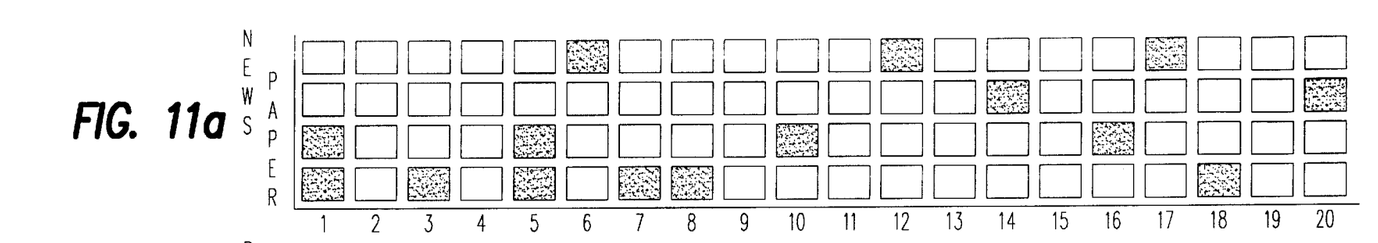
FIGS. 11a, 11b, 11c, and 11d show four types of documents and which of their frames is most relevant when riffling through the document.

The document type shown in FIG. 11a is a newspaper. Those text frames corresponding to article headlines are the most useful feature for directing fast browsing. Only the frames containing headlines are placed in the candidate context. This is based on the observation that newspaper readers are more likely to scan all the headlines on a page before focusing on a particular story.

Figure 11B:
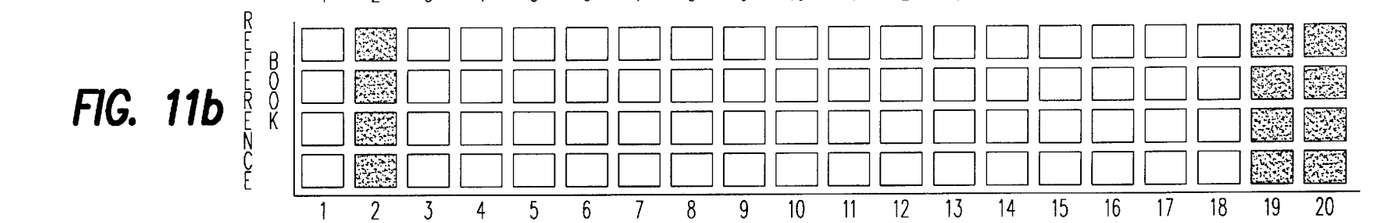

The reference book diagrammed in FIG. 11b places emphasis on the accessibility of the table of contents (page 2) and the index pages (pages 19 and 20). This supports the most common mechanism employed to identify a particular location within a reference book, which is to obtain a page number from the contents or index and move directly from there to the indicated page.

Figure 11C:
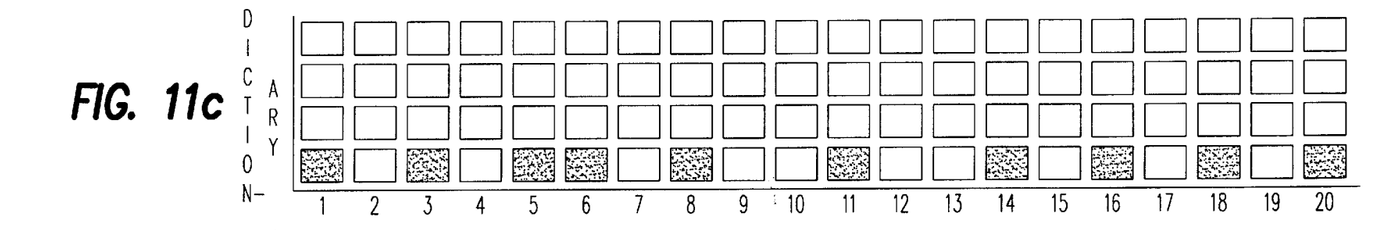

FIG. 11c illustrates the frames of a dictionary. The frames corresponding to each new letter heading are prefetched. Users of dictionaries, when rapidly riffling through them, use the current 'letter zone' as the most critical indexing information.

Figure 11D:
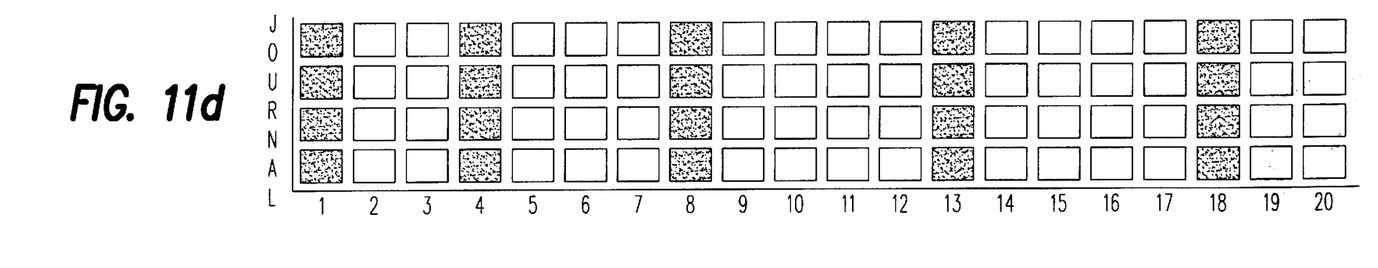

A journal style book is diagrammed in FIG. 11d. A typical style of use is a fairly random order browse, with 'eye catching' articles, usually represented by large headlines or arresting photographs, serving as the indexing tool. Therefore, the first page of each article is prefetched.

These examples indicate how knowledge of the particular document type can be used to optimize the prefetching strategies. This is another way in which semantic hinting can be used to facilitate document viewing at different speeds.

What is claimed is:

1. A method for viewing electronically stored documents at different speeds, the speed being adjustable by the user, the method comprising the steps of:

storing the electronic documents in long term memory as a plurality of pages, a page being further stored as a plurality of frames, each frame comprising a data type, each data type encompassing a class of image features displayed in one or more frames;

rating the stored frames, the rating depending on at least the frame's data type and/or location; and moving a select group of frames from the long term memory into a cache memory depending upon a selection criteria comprising the user selected viewing speed and the rating of the frame, said select group of frames consisting of only frames to be displayed in accord with said selection criteria.

2. A method according to claim 1 wherein at a first user selected viewing speed, all of the stored frames are moved into the cache memory regardless of their rating.

3. A method according to claim 2 wherein, at a second user selected viewing speed, only frames having a rating above a first predetermined rating are moved into the cache memory.

4. A method according to claim 3 wherein, at a third user selected viewing speed, only frames having a rating above a second predetermined rating greater than the first predetermined rating are moved into the cache memory.

5. A method according to claim 4 wherein the electronically stored document is made visually to resemble a book on display screen, and wherein selecting the first, second and third viewing speeds incrementally increases the speed at which pages of the book appear.

6. A method according to claim 1 wherein one or more of stored pages are also rated.

7. A method according to claim 6 wherein more weight is given to page ratings than frame ratings in determining which frames are moved into the cache memory.

8. A method according to claim 6 wherein the page rating determines whether a page is pre-loaded into the cache memory prior to document viewing by a user.

9. A method according to claim 1 wherein fewer frames of each successive page are moved from the long term memory to the cache memory as the user selects increasingly higher viewing speeds, with at least one frame from each successive page which indicates the position of the frame within the book being moved from the long term memory to the cache memory.

10. A method according to claim 1, wherein for a page of which not all frames are stored in a cache memory, the additional step of displaying said page and replacing a part of the information in said page by one or more default renditions representative of a data type.

11. A method according to claim 1 wherein three attributes are recorded for a frame and influence its rating, one attribute indicating the appearance of the frame, one attribute indicating the logical function of the frame in the page and the other attribute indicating the position of the frame on the page.

12. A system for permitting a user to view electronically stored documents at different speeds, the system comprising:

a long term memory for storing the documents as a series of pages, each page in turn being formed from a plurality of frames, a cache memory for temporarily storing frames recalled from the long term memory;

a processor coupled to the cache memory and the long term memory so that, on the processor receiving from a user both a request for a stored document and a requested viewing speed, the processor transfers selected frames from the long term memory into the cache memory, said selected frames that are transferred consisting of only frames to be displayed in accord with said request for said stored document and said requested viewing speed;

a display coupled to the processor for displaying pages and frames;

wherein each frame is rated relative to its viewing priority based at least on image contents of the frame and in that the rating of a frame and the requested viewing speed determine whether the processor recalls the frame to the cache memory.

13. A system according to claim 12 wherein the processor recalls increasingly fewer frames from the long term memory to the cache memory as the requested viewing speed increases.

14. A method for viewing electronically stored documents at different speeds, the speed being adjustable by the user, the method comprising the steps of:

storing the electronic documents in long term memory as a plurality of pages, a page being further stored as a plurality of frames, each frame comprising a data type, each data type encompassing a class of image features displayed in one or more frames;

rating the stored pages and frames, the rating of a stored page or frame depending on at least one of a contextual attribute or a locational attribute of said page or frame; and moving a select group of frames from the long term memory into a cache memory depending upon a selection criteria comprising the user selected viewing speed and the rating of the frames in the group or pages containing frames in the group.

* * * * *